Jan. 7, 1941.   P. V. JENSEN   2,228,117
CAPSULING MACHINE
Filed June 29, 1939
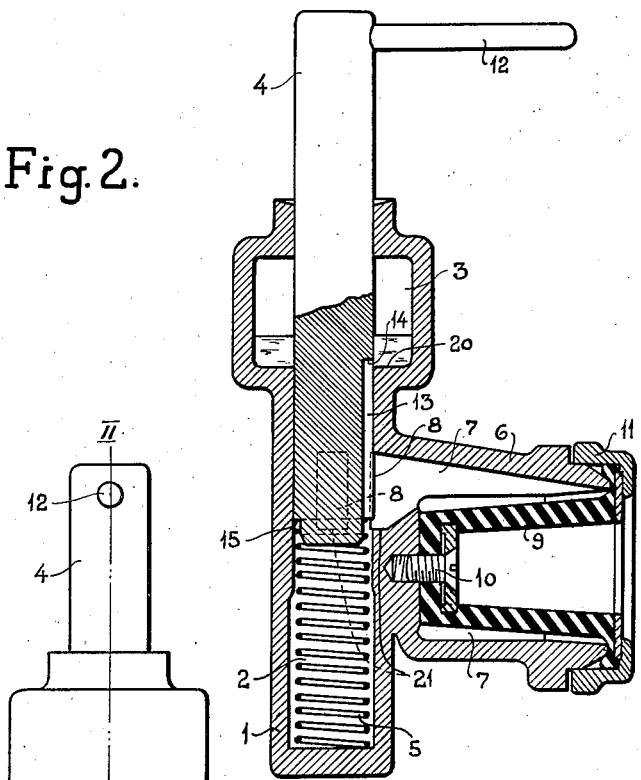
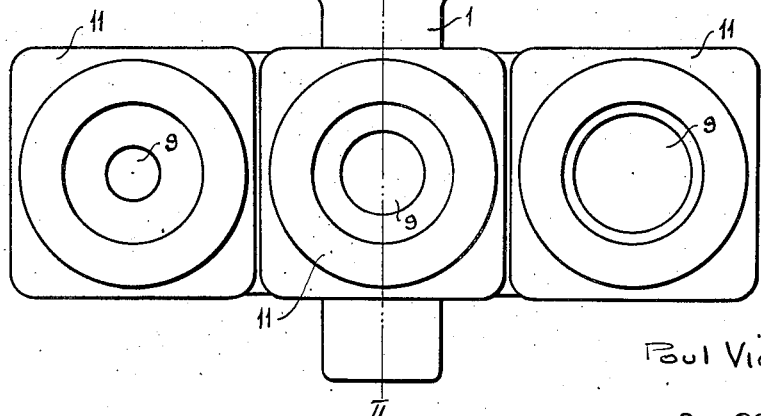
Poul Viggo Jensen
INVENTOR
his ATTY.

Patented Jan. 7, 1941

2,228,117

UNITED STATES PATENT OFFICE 2,228,117

CAPSULING MACHINE

Poul Viggo Jensen, Copenhagen, Denmark

Application June 29, 1939, Serial No. 281,800
In Denmark August 26, 1938

1 Claim. (Cl. 226—85)

The invention relates to capsuling machines for capsuling bottles and like containers, more particularly to capsuling heads for such machines of the kind having a plurality of capsuling members of mutually different size each consisting of a cup made from yielding material and encircled by a liquid filled chamber, all of which liquid chambers are connected to a common pressure chamber fitted with a reciprocating pressure piston.

The objects of the invention are first to provide a new and improved capsuling head of the kind referred to, which is easy to operate; second to enable the capsuling member fitting the bottle, which is going to be capsuled, to be easily connected to the pressure chamber without fault at the same time closing all the other liquid chambers from the pressure chamber; third to enable these operations to be performed by means of one and the same handle, without making use of a plurality of cocks.

These objects are attained by forming the pressure piston as a plug of a cock adapted for optionally connecting one single of said liquid chambers to the said pressure chambers.

In order that the invention may be better understood reference should be made to the accompanying drawing on which a capsuling head in accordance with the invention is shown for illustrative purposes alone.

Fig. 1 shows the capsuling head in front elevation, and

Fig. 2 a section along the line II—II in Fig. 1.

The capsuling head consists of a casing 1 containing a pressure chamber 2, and a liquid reservoir 3. A tightly fitting pressure piston 4 is adapted to slide in the casing 1 and is actuated by a spring 5 disposed in the pressure chamber 2 and tending to maintain the piston 4 lifted.

Alongside the casing 1, several casings 6 are provided, each enclosing a liquid chamber 7, all of which chambers are connected to the pressure chamber 2 by means of channels 8. Each of the liquid chambers 7 contains a cup 9 made from a yielding material and forming the capsuling implement proper. The cups 9 are of mutually differing sizes. They are maintained in in position in the liquid chambers 7 partly by means of a bottom screw 10 and partly by means of a plate 11.

In the construction shown the piston 4 consists of a mainly cylindrical rod which is journalled in the casing 1 and has a laterally projecting handle 12 by means of which it can be rotated. In the piston a channel 13 is provided which in the raised position of the piston connects the pressure chamber 2 with the reservoir 3 and, at the top of the latter, is limited by a cutting edge 14.

The piston has at the bottom a cutting edge 15 which serves to close the channels 8 and, in the raised position of the piston, opens a portion of the channels 8, in such a manner that in the raised position of the piston there is a connection between the pressure chamber 2 and all the liquid spaces 7.

When a bottle is to be capsuled, the piston 4 is turned in such a manner that the channel 13 is caused to stand opposite the one of the channels 8 for which the corresponding cup 9 will fit the size of the bottle neck. When now the piston 4 is depressed from the topmost position shown in Fig. 2, the piston will tend to displace some of the liquid from the pressure chamber 2. As long as there is a connection by way of the channel 13 between the pressure chamber 2 and the reservoir 3 the liquid displaced will flow through the channel 13 to the liquid reservoir. This flow can only continue until the cutting edge 14 has passed the corresponding cutting edge 20 in the liquid reservoir, after which the connection between the pressure chamber 2 and the reservoir 3 will be closed.

When the piston is in its uppermost position the cutting edge 15 will be in such a position that there will be free passage between the pressure chamber 2 and all the channels 8. When the cutting edge 15 during the downward motion of the piston passes the corresponding cutting edges 21 in the channels 8, the connection between the pressure chamber 2 and all the channels 8, except the one that is opposite the channel 13, will be closed. The conditions should be adjusted in such a manner that the cutting edge 15 will pass the cutting edges 21 before, or at the same time as, the cutting edge 14 passes the cutting edge 20.

During the continued downward motion of the piston there will only be a connection between the pressure chamber 2 and the particular liquid chamber 7 opposite which the channel 13 is located and therefore only the cup 9 corresponding to the bottle will be subjected to pressure and will be able to capsule the bottle.

When now the piston is again moved upward, the pressure on the cup will fall at the start and subsequently the cutting edges 14 and 15 on the piston 4 will pass the cutting edges 20 and 21 in the casing 1, and will thereby open the connection between all the liquid spaces 7, the pressure chamber 2 and the reservoir 3, in such a manner that an equalisation of the pressure will be effected at the same time that any liquid that might have passed into the reservoir 3 on account of leakage between the piston 4 and the casing 1 will return to the pressure chamber 2.

I claim:

Capsuling head for bottle capsuling machines, comprising a plurality of capsuling members, each including an elastic cup and a liquid filled chamber encircling said cup, a common pressure cylinder having a portion filled with pressure liquid and being provided with a plurality of ports communicating with said liquid filled chambers, respectively, and a piston fitted rotatably into said cylinder for reciprocation therein past said ports, said piston being provided with a passage for selectively connecting any one of said ports with the liquid filled portion of said pressure cylinder when said piston is depressed in a correspondingly selected annular position.

POUL VIGGO JENSEN.